United States Patent [19]

Atherton et al.

[11] Patent Number: 4,649,304
[45] Date of Patent: Mar. 10, 1987

[54] INTERCONNECTION SYSTEM FOR ELECTRICAL MOTORS

[75] Inventors: Charles G. Atherton, Mechanicsburg; John C. Swartz, Harrisburg, both of Pa.

[73] Assignee: AMP Incorporated, Harrisburg, Pa.

[21] Appl. No.: 797,726

[22] Filed: Nov. 13, 1985

[51] Int. Cl.⁴ .............................................. H02K 11/00
[52] U.S. Cl. .................................. 310/71; 310/68 C; 339/98
[58] Field of Search ...................... 310/71, 68 R, 68 C, 310/68 B, 216, 254, 42, 68 A; 339/95 D, 97 R, 98, 99 R; 174/138 F; 361/23–25; 200/297, 304, 305

[56] References Cited

U.S. PATENT DOCUMENTS

| | | | |
|---|---|---|---|
| 4,054,767 | 10/1977 | Anderson | 310/688 |
| 4,178,523 | 12/1979 | Lyerly | 310/71 |
| 4,187,416 | 2/1980 | Caro | 200/304 |
| 4,198,583 | 4/1980 | Anderson | 310/71 |
| 4,237,510 | 12/1980 | Thompson | 361/24 |

FOREIGN PATENT DOCUMENTS 2538085  3/1977  Fed. Rep. of Germany .... 310/68 C

Primary Examiner—R. Skudy
Attorney, Agent, or Firm—F. W. Raring

[57] ABSTRACT

The required electrical connections between the ends of the windings on an electrical motor, the switch terminals for the motor, and the motor protector are made by means of an electrical connector which comprises a housing having a plurality of cavities. Each of the cavities has a double-ended terminal therein to which the winding ends are connected. Each terminal also has a receptacle portion which receives a tab extending from either the motor protector or the switch. The connector, the motor protector, and the switch are clustered adjacent to each other with the protector against or adjacent to the coil windings of the motor. The shape of the connector housing, the protector, and the switch, and the location of the cavities in the connector and the terminals on the switch is such that when the parts are assembled to each other on the motor, all of the required electrical connections will be made correctly.

12 Claims, 7 Drawing Figures

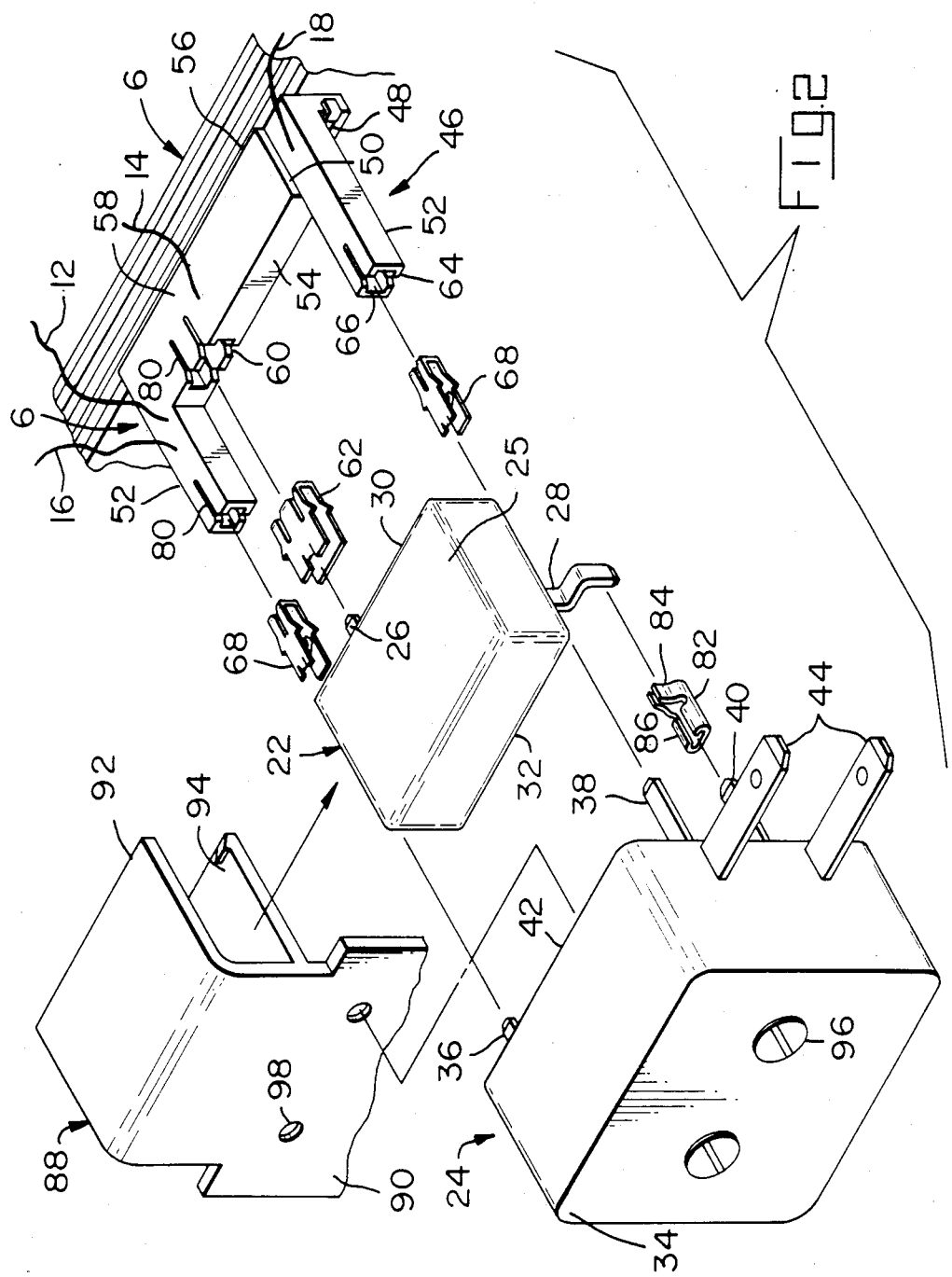

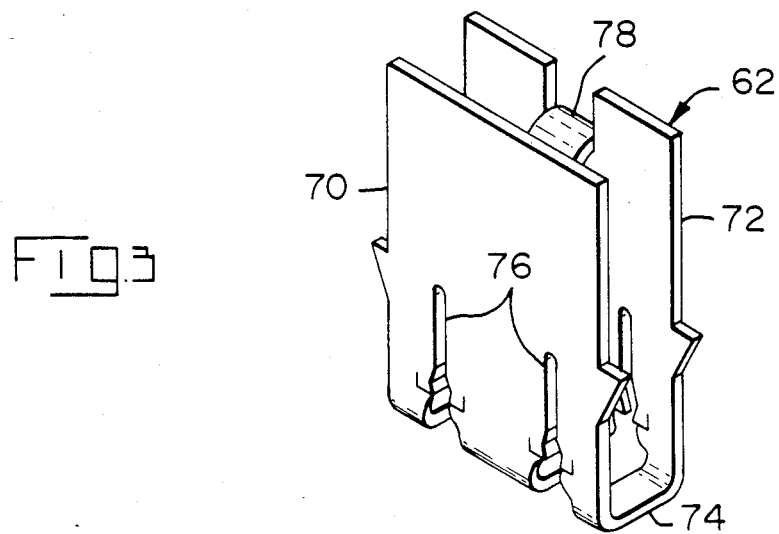
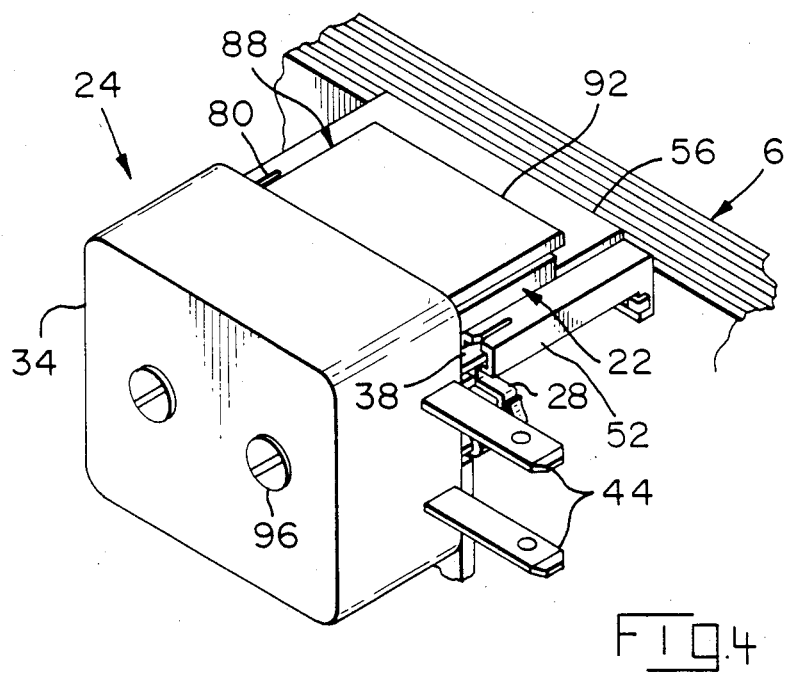

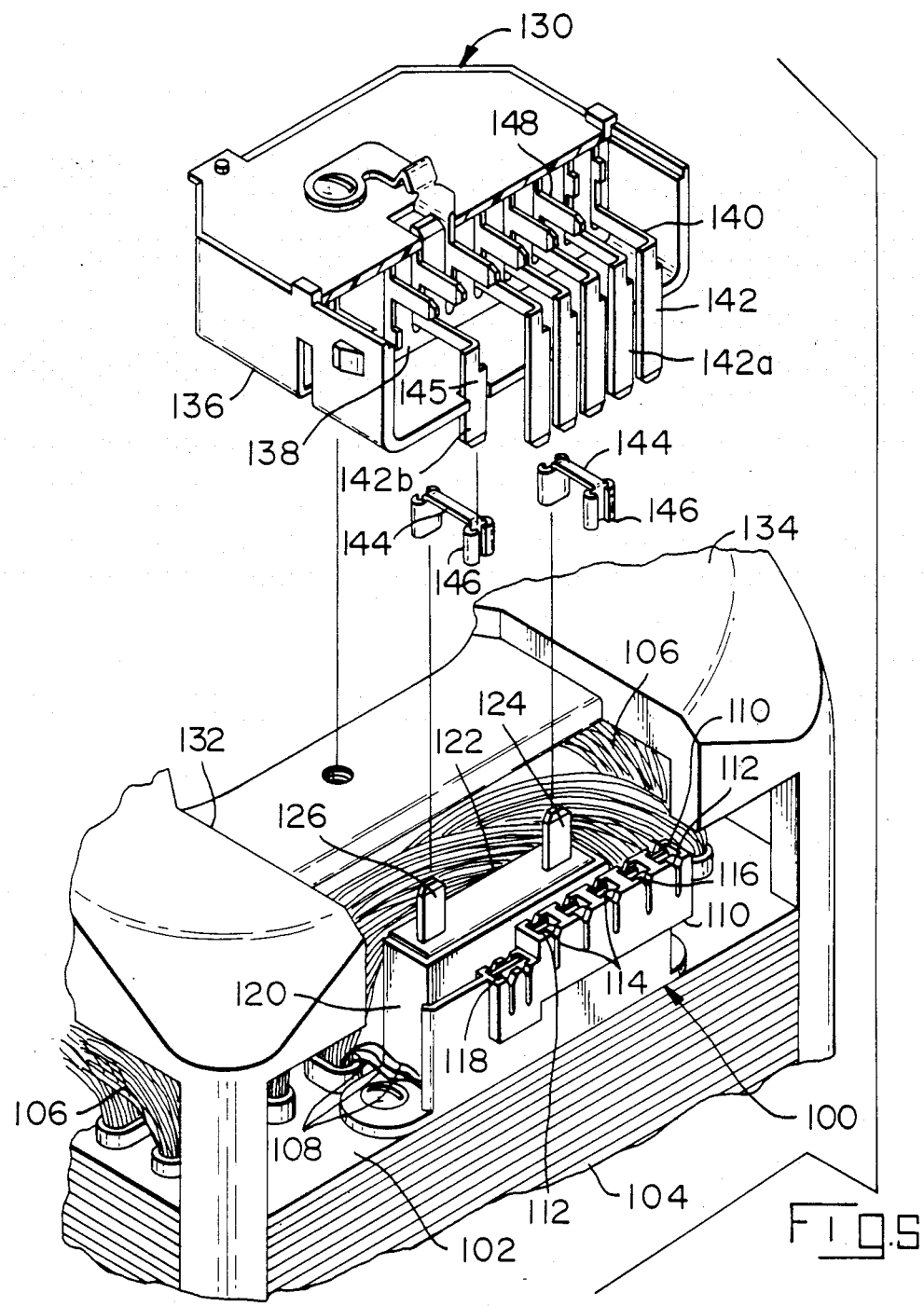

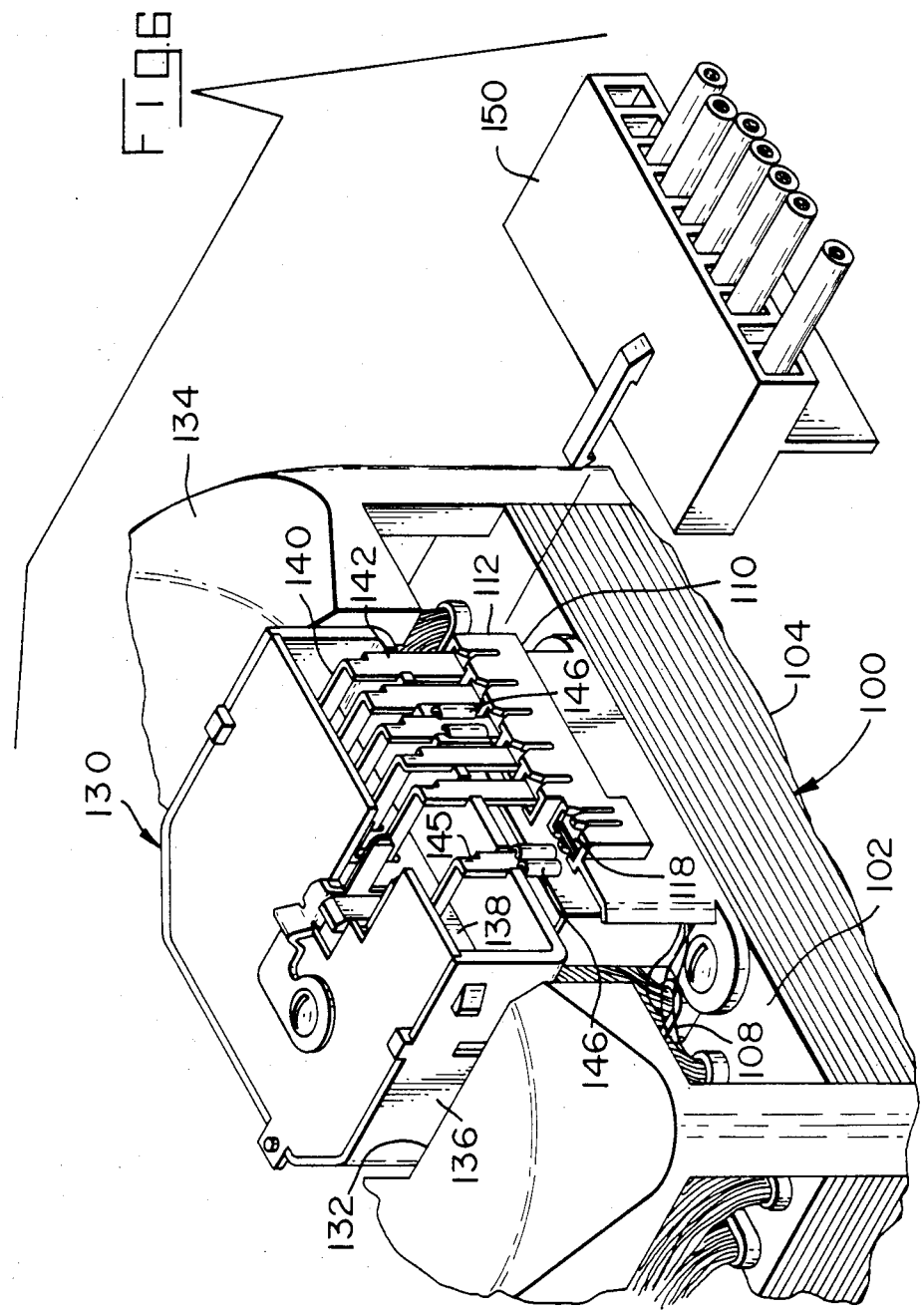

INTERCONNECTION SYSTEM FOR ELECTRICAL MOTORS

FIELD OF THE INVENTION

This invention relates to interconnection systems for electric motors for bringing about the necessary electrical connections between the ends of the windings on the motor stator, the motor protector, and the motor switch.

BACKGROUND OF THE INVENTION

An electrical motor will commonly comprise a motor stator having at least two coil windings thereon, a motor protector which is connected in series with at least one of the windings, and a switch having terminals which are selectively connected to the motor protector and to the ends of the windings. A relatively simple form of motor such as a single phase induction motor will have two windings and a switch having at least three terminals. The motor protector will have two terminals. When the connections are made between the winding ends and the terminals of the protector and the switch, at least one of the winding ends is connected to one of the protector terminals and the remaining winding ends are connected to switch terminals. A direct connection is made between the remaining protector terminal and one of the switch terminals. Frequently, two of the winding ends will be connected commonly to the one protector terminal so that the remaining two winding ends are connected individually to switch terminals.

Other types of electrical motors having more complex terminals may have additional winding ends and may have in excess of three terminals on the switch.

It is common practice in the electrical motor art to make the required connections for an electric motor by means of lead wires extending between the ends of the windings and the terminals of the protector and the motor. The manufacturing process thus requires that after the coils have been wound on the stator core, the lead wires be connected to the ends of the coil windings by crimped connections and these connections must be insulated. Also, color-coded wires must be used when these lead wires are connected to the winding ends in order to indicate the precise terminals in the protector or switch to which the particular leads must be connected. The leads are provided with tab receptacles on their free ends so that after the switch and the protector are assembled to the stator, a technician can connect the lead wires to the terminals of the switch and protector in accordance with a wiring diagram that shows the color-coded wires extending to their proper terminals.

The manufacturing method described above is time consuming, requires considerable skilled manual labor, and presents many opportunities for errors or mistakes. For example, when the lead wires are connected by crimped connections to the ends of the coil windings, the technician performing this operation must select the proper colors of lead wires for predetermined winding ends. At the later stage when the lead wires are connected to the terminals, the technician again must select the proper lead wires and identify the proper terminal in the protector or the switch to which the lead must be connected. An additional disadvantage of this known manufacturing method is that several electrical interfaces are interposed between the ends of the coil windings and the terminals on the protector or switch; an electrical interface is formed at the crimped connection between the lead wire and the coil winding end, an additional interface exists at the crimped connection between the lead wire and the terminal on the end of the lead wire, and the final interface exists at the connection between the terminal tab on the switch and the receptacle on the lead wire. It is always desirable to cut down on the number of electrical interfaces in a wiring system in order to improve reliability and the wiring systems used for electric motors would be improved if the number of interfaces could be reduced.

The present invention is directed to an improved wiring system for electrical motors which makes use of an electrical connector arranged such that the number of interfaces is substantially reduced, the number of parts required (such as terminals and wires) is substantially reduced, and the possibility of mistakes being made in the wiring process is substantially eliminated.

THE INVENTION

An electrical motor assembly in accordance with the invention comprises a stator core, at least two coil windings on the core, a motor protector, and a switch. The coil windings have at least four winding ends which extend from the coil windings and the protector comprises a protector body having first and second protector terminals. The switch comprises a switch housing having at least three switch terminals. At least one winding end is connected to the first protector terminal and the second protector terminal is connected to one of the switch terminals. At least two winding ends are individually connected to other switch terminals. The assembly is characterized in that a multicontact electrical connector is provided, the connector comprising an insulating housing having at least one first terminal-receiving cavity and at least two additional terminal-receiving cavities therein. The cavities extend into the housing surface and each has an entrance portion which is proximate to the housing surface. The first cavity has a first connector terminal inserted therein and each additional cavity has an additional connector terminal inserted therein. The first terminal and each of the additional terminals has a wire-connecting portion and a matable contact portion which is matable with a complementary matable contact portion. The protector terminals and the switch terminals extend from the protector body and the switch housing respectively and are sheet metal terminals having complementary matable contact portions on their ends. The protector body, the switch housing, and the connector housing are adjacent to each other in a cluster which is adjacent to the stator core. At least one winding end extends to the first cavity and is connected to the wire-connecting portion of the first terminal. At least two winding ends extend to at least two additional cavities and are connected to the wire-connecting portions of the two additional terminals in the additional cavities. The first protector terminal extends to the first cavity and has its complementary matable contact portion mated with the matable contact portion of the first terminal. At least two of the other switch terminals extend to at least two of the additional cavities and have their complementary matable contact portions mated with the matable contact portions of the additional connector terminals in the additional cavities. A conductor extends between, and connects, the second protector terminal and the one switch terminal.

In accordance with further embodiments, the connector terminals each has a leading end and a trailing end, the leading ends being remote from the cavity entrances and the trailing ends being proximate to the cavity entrances. The wire-connecting portions of the terminals are on the leading ends and the matable contact portions are on the trailing ends.

In all embodiments of the invention, the positions of the protector body, the switch housing, and the connector housing relative to each other in the cluster are determined by the configurations of the protector body, the switch housing, the connector housing, and by the positions of the first and second protector terminals on the protector body, by the positions of the switch terminals on the switch housing, and by the locations of the cavities.

THE DRAWING FIGURES

FIG. 2 is a fragmentary exploded view showing a portion of the core of the stator, the connector, the motor protector, and the motor switch with the parts in alignment with each other.

FIG. 3 is a perspective view of an electrical connector terminal of a type which can be used in the practice of the invention.

FIG. 4 is a view similar to FIG. 2 but showing the parts assembled to each other.

FIG. 5 is a perspective view showing a portion of a stator, the motor switch, the protector, and the electrical connector in accordance with an alternative embodiment of the invention, the parts being exploded from, and in alignment with each other in this view.

FIG. 6 is a view similar to FIG. 5 but showing the parts assembled to each other on the stator.

THE DISCLOSED EMBODIMENT

Figure 1:
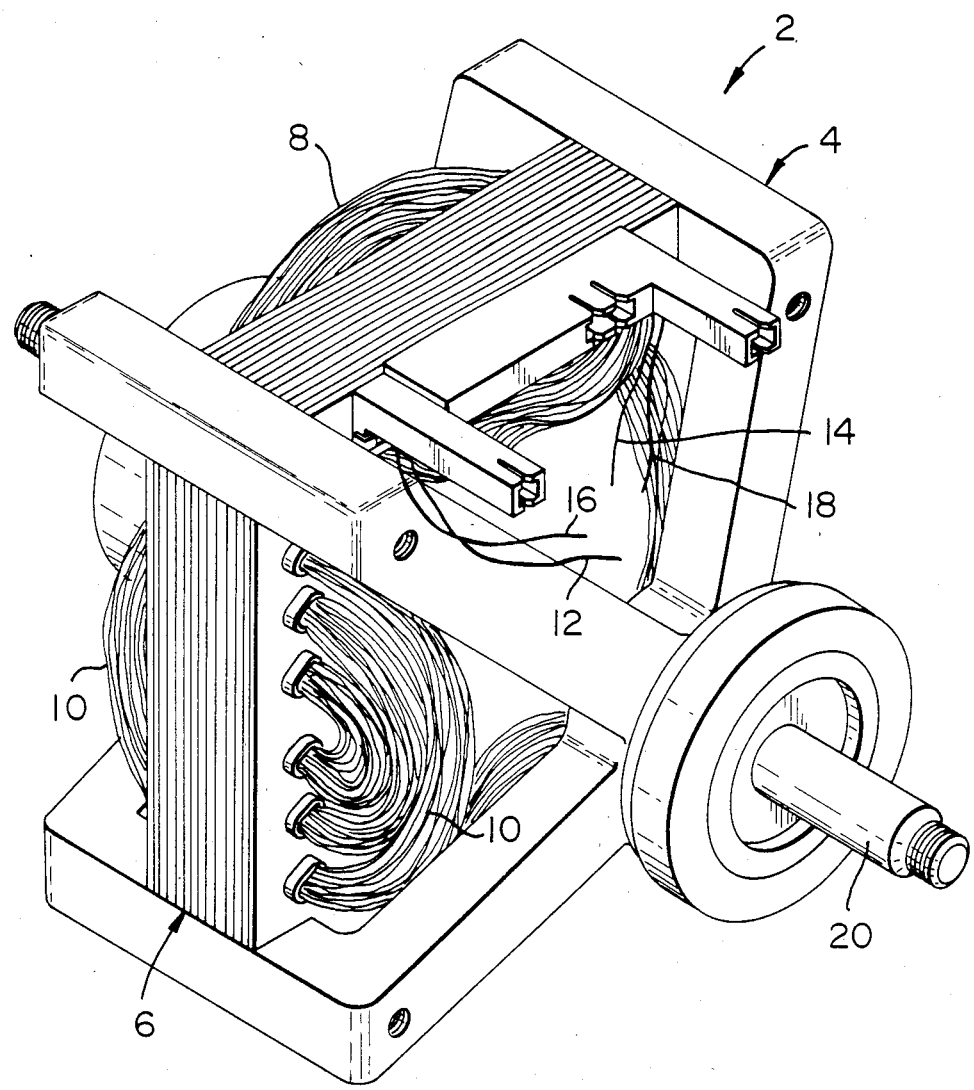
FIG. 1 is a perspective view of a motor stator having a connector used in the practice of the invention mounted on the stator core, the rotor not being shown in this view in the interest of clarity.

FIG. 1 shows a motor assembly 2 comprising a frame 4, a stator core 6 which comprises a stack of laminae, windings 8, 10 on the stator core, and winding ends 12, 14, 16, 18, these winding ends being the ends of the coil windings on the core. The shaft is shown at 20 and would extend from the rotor of the motor, however, the rotor is not shown in FIG. 1 in the interest of clarity.

FIG. 2 shows a protector 22 for the motor which is connected to the windings as described below, and the switch 24 by means of which the operation of the motor is controlled. The protector comprises a protector body 25 having first and second tab-type protector terminals 26, 28 extending therefrom. The first protector terminal 26 extends from the surface 30 of the body which faces rightwardly in FIG. 2 and the second protector terminal extends from the downwardly-facing surface 32, the second terminal being offset at its ends for reasons described below.

The switch 24 comprises a switch housing 34 having tab-type switch terminals 36, 38, 40 extending from its face 42 and which are connected to the protector and to the winding ends as will also be described below. Additional tab-type input or power terminals 44 extend from a side surface of the switch housing.

The wiring connections for the motor assembly shown in FIGS. 1 and 2 require that two of the winding ends 12, 14 be connected to the first protector terminal 26 and the remaining two winding ends 16, 18 be connected to the switch terminals 36, 38. The remaining switch terminal 40 is connected to the second protector terminal 28. As explained previously, it has been common practice heretofore to make all of these connections by means of color-coded lead wires which are connected to the winding ends by crimped connections and which are connected to the terminal tabs by tab receptacles on the ends of the lead wires.

In accordance with the present invention, a connector 46 is provided to make the required connections for the motor. This connector comprises a housing 48 of insulating material having a body portion 50 and arms 52 extending leftwardly as viewed in FIG. 2 from the body portion. The surface 54 of the housing between the arms 52 is a mating face in that the surface 30 of the protector is against the surface 54 when the parts are assembled to each other. The housing body has a rear face or mounting face 56 which is against the core and is secured thereto by fastening means as shown and the housing body has oppositely-facing sidewalls, 58 which extend from the rear face 56 to the mating face 54.

A first terminal-receiving cavity 60 extends into the mating face adjacent to the left-hand end thereof and is in alignment with the first protector terminal 26 of the protector 22. A first connector terminal 62 is inserted into this cavity to connect the winding ends to the terminal 26. The arms have free ends 64 and additional terminal-receiving cavities 66 extend into these free ends. These additional cavities each receive a terminal, herein referred to as an additional terminal as shown at 68.

All of the terminals are sheet metal terminals of the type commonly known and the connector terminal 62 is shown on an enlarged scale in FIG. 3. This connector terminal comprises a pair of parallel plate sections 70, 72 which are connected to each other at their lower ends by a bight or bend 74. A pair of wire-receiving slots 76 extend into the bright and upwardly as viewed in FIG. 3 in the two plate sections. The width of these slots is such that when winding ends are moved into the slots, the varnish type insulation on the winding ends will be penetrated and electrical contact will be established. At its upper end as viewed in FIG. 3, a contact spring or tongue 78 is formed on the plate member 72 and extends downwardly and between the two plate members. This contact arm 78 and the internal surface of the plate member 70 serve as a tab receptacle or a matable contact portion in the connector terminal 62.

The additional connector terminals 68 are substantially similar to the connector terminal 62 excepting that they have only a single wire-receiving slot as shown in FIG. 2.

All of the cavities 60, 66 have associated wire-admitting slots 80, the cavity 60 having two such slots while the cavities 66 have only a single slot. When the winding ends are to be connected to the connector terminals, the appropriate winding ends are placed in the wire-admitting slots with the axes of the winding ends extending across the cavities. When the connector terminals are moved into the cavities then, the windings will move relatively into the wire-receiving slots of the connector terminals. The connector terminals are moved into the cavities with their bight ends or leading ends first so that the trailing ends having the tab receptacles are proximate to the entrances to the cavities.

In order to make the necessary interconnections for the motor of FIG. 2 then, it is merely necessary to place the winding ends 12, 14 in the wire-admitting slots 80 of the first cavity 60, to place the winding ends 16, 18 in the wire-admitting slots 80 of the cavity 66, and to move the first connector terminal into the 62 cavity 60 and the additional connector terminals 68 into the cavity 66. The protector 22 can then be moved rightwardly from the position of FIG. 2 until it is between the arms 52 of the connector and the first protector terminal 26 will move into the tab receptacle of the first connector terminal 62 and thereby be connected to the winding ends 12, 14. Thereafter, the switch 24 is moved rightwardly until the switch terminals 36, 38 are received in the receptacle portions of the connector terminals 68 and the cavities 66 on the ends of the arms. In this manner, the winding ends 16, 18 are connected to the switch terminals 36, 38 of the switch 24.

The second protector terminal 28 is connected to the switch terminal 40 by means of a double-ended splicing terminal 82, this terminal being doubled ended in the sense that it will receive a tab terminal at each end thereof. On its right-hand end, the splicing terminal 82 has upwardly extending ears 84 which receive the offset end of protector terminal 28. At its left-hand end it has a conventional receptacle 86 for a tab.

The tab receptacle portions of the connector terminals 62, 68 can be referred to as matable contact portions and the ends of the terminal tabs such as the tabs 36 or 26 are complementary matable contact portions.

The embodiment of the invention shown in FIGS. 2 and 3 is provided with a bracket 88 having a web portion 90 and spaced-apart flanges 92, 94 between which the protector is received. This bracket may be secured to other structure as required and has threaded openings 98 which receive screws 96 extending through the switch housing. There are a wide variety of electrical motors manufactured and the shapes of the parts such as the frames or the windings may vary slightly. Also, the housings are not identical and each embodiment of the invention must therefore be tailored to the shape of the motor and its casing as well as to the interconnection requirements of the particular motor.

FIGS. 5 and 6 show an alternative embodiment of the invention for a motor having a wiring system which is somewhat more complex than the motor described above. In FIGS. 5 and 6, the connector 100 is mounted on the upper surface 102 or the stator core 104 by means of fasteners as shown. The windings 106 have in this instance seven winding ends 108 which are connected to the protector and to the switch as will be described below.

The connector 100 has a body portion 110 having an upwardly facing mating face 112. The first cavity 116 which corresponds in function to the first cavity 60 of the embodiment of FIG. 2 which receives a winding end is located as the second cavity from the right in FIG. 5 and receives only a single winding end in this embodiment. The additional cavities 114 are identical to the cavity 116 excepting for a splicing cavity 118 at the left-hand end of the body portion. In this embodiment, two of the winding ends must be connected to each other and accordingly, a cavity 118 is provided for a terminal of the type shown at 62 (FIG. 2) which is capable of commonly connecting two winding ends to each other the terminal inserted into the splicing cavity 118 will thus function as a splicing terminal. No other connections are made in the cavity 118.

The connector has an integral shroud or casing 120 for the protector 122 which is disposed immediately adjacent to the windings and the protector body in this instance has its first and second protector terminals 124, 126 extending upwardly from its upper surface.

The switch 130 is mounted in a notch or recess 132 in the motor frame 134. The switch comprises a switch housing 136 having a mating face 138 which extends in a plane that is perpendicular to the plane of the mating face 112 of the connector body. A row of L-shaped terminals 140 extend from the mating face and with depending tab-type switch terminals 142. The second tab-type switch terminal from the right in FIG. 5 identified as 142a is received in the receptacle portion in the cavity 116, while the remaining depending tab-type switch terminals 142 are received in the cavities 114 and thereby connected to the terminals in these cavities and to the winding ends.

In this embodiment, the winding end which extends to the cavity 116 is connected then to the tab-type switch terminal 142a and is also connected to the first protector terminal 124 by a double ended terminal device 144 having tab receptacles 146 at its ends. In assembling the parts, the terminal 144 on the right in FIG. 5 is moved upwardly until the tab receptacle receives the tab-type switch terminal 142a. Thereafter and as the switch is moved downwardly, the projecting portion of tab-type switch terminal 142a enters the terminal in cavity 116 and the receptacle portion of the terminal 144 on the left receives the first protector terminal 124.

One tab-type switch terminal, 145, is connected to the second protector terminal 126 by means of a doubled-ended terminal 144 which receives the end of the tab-type switch terminal 145 and the tab 126 extending from the protector. This provides the direct connection between one of the protector terminals and one of the switch terminals.

The required connections between the winding ends 108, the protector terminals 124, 126, and the tab-type switch terminals 142, 142a are made essentially as described above with reference to the embodiment of FIGS. 1-4. The connector is secured to the upper surface 102 of the stator and the appropriate winding ends are positioned in the wire-admitting slots of the connector housing. Thereafter, the connector terminals which are received in these cavities (and are similar to the terminals shown at 68 in FIG. 2) are moved into the cavities. In FIG. 5, the terminals have already been inserted into the terminal-receiving cavities of the connector housing. The connections are thus made between the winding ends and the terminals in the connector. Thereafter, the double-ended terminals 144 are assembled to the tab-type switch terminals 142a and 145 and finally, the switch assembly is moved into the recess 132. The proper tab terminals on the switch will then enter the proper cavities of the connector and the motor will be fully wired.

The switch has a upper row of terminals 148 which are above the terminals 140 so that when a connector 150, FIG. 6, is moved into the space above the terminals 140, the wires extending to the connector 150 will be connected to the terminals 148 and all external connections for the motor will have been made.

Figure 7:
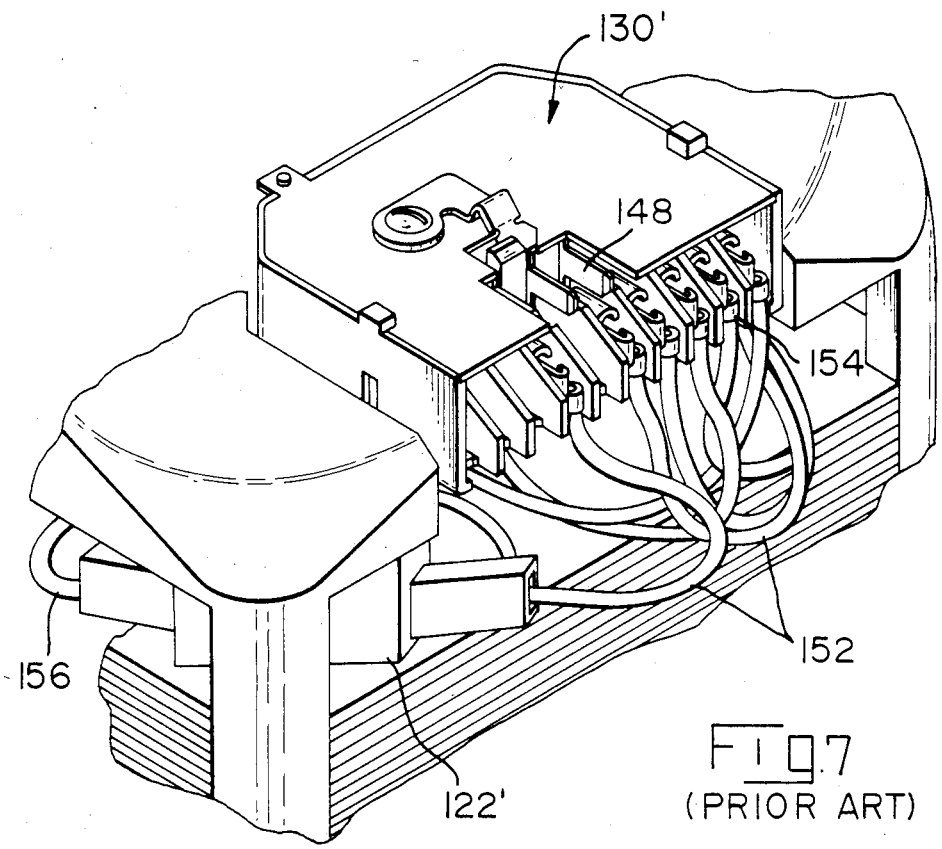
FIG. 7 is a view similar to FIG. 6 but showing the prior art method of making the connections between the winding ends, the switch, and the stator.

FIG. 7 shows the prior art wiring system for a motor of the type shown in FIGS. 5 6 and is presented for comparison purposes. In this prior art system, the switch 130' has an upper row of terminals 148 for making connections to a connector 150 and has a lower row of simple tab-type terminals similar to the terminals 148. All of the connections to the winding ends and to the protector 122' are made by lead wires 152. These lead wires have disconnect type receptacle terminals 154 on their ends which can be connected to the terminal tabs and the switch 130' and are spliced to the ends of the windings by crimped connections (not shown). The connections to the protector 122' are also made by a lead wire extending from the switch 130' and by means of a lead wire 156 which extends also to one of the winding ends.

The principles of the invention can be used with a wide variety of electrical motors and the specific details of any particular embodiment of the invention will vary, depending upon the shape of the motor, the number of coil windings and winding ends, and the arrangement of the switch. The advantages of the invention will be apparent from a comparison of FIG. 7 and FIG. 6. There are numerous possibilities for making mistakes in making the electrical connection shown in FIG. 7 and the technician assembling the motor must rely upon the color coding of the wires 152 in order to connect the winding ends to the proper terminals in the switch. In the preferred practice of the present invention, the parts however, are designed such that they can be put together in only one manner and when they are so assembled to each other, all of the electrical connections will be properly made. In addition, the number of electrical interfaces in the practice of the invention is greatly reduced.

We claim:

1. An electric motor assembly comprising a stator core, at least two coil windings on the core, a motor protector, and a switch, the coil windings having at least four winding ends which extend from the coil windings, the protector comprising a protector body having first and second protector terminals, the switch comprising a switch housing having at least three switch terminals, at least one winding end being connected to the first protector terminal, the second protector terminal being connected to one of the switch terminals, at least two winding ends being individually connected to other switch terminals, the assembly being characterized in that:

a multicontact electrical connector is provided, the connector comprising an insulating connector housing having a first terminal-receiving cavity and at least two additional terminal-receiving cavities therein, the cavities extending into the housing surface and each having an entrance portion which is proximate to the housing surface, the first cavity having a first connector terminal inserted therein, each additional cavity having an additional connector terminal inserted therein, the first connector terminal and each of the additional connector terminals having a wire-connecting portion and a matable contact portion which is matable with a complementary matable contact portion, the protector terminals and the switch terminals extending from the protector body and the switch housing respectively, and being sheet metal terminals having complementary matable contact portions, the protector body, the switch housing, and the connector housing being adjacent to each other in a cluster which is adjacent to the stator core, at least one winding end extending to the first cavity and connected to the wire-connecting portion of the first connector terminal, at least two winding ends extending to at least two additional cavities and connected to the wire-connecting portions of two additional connector terminals therein, the first protector terminal extending to the first cavity and having its complementary matable contact portion mated with the matable contact portion of the first connector terminal, at least two of the other switch terminals extending to at least two of the additional cavities and having their complementary matable contact portions mated with the matable contact portions of the additional connector terminals in the additional cavities, and a conductor extending between, and connecting, the second protector terminal and the one switch terminal.

2. An electrical motor assembly as set forth in claim 1 characterized in that each of the connector terminals has a leading end and a trailing end, the leading ends being remote from the cavity entrances and the trailing ends being proximate to the cavity entrances, the wire-connecting portions being on the leading ends, the matable contact portions being on the trailing ends.

3. An electric motor assembly as set forth in claim 2 characterized in that the wire-connecting portions comprise wire-receiving slots, the matable contact portions being contact tab receptacles, the complementary matable contact portions being contact tabs.

4. An electric motor assembly as set forth in either of claims 1 or 3 characterized in that the conductor extending between the second protector terminal and the one switch terminal is a double-ended sheet metal terminal having at each end thereof a matable contact portion.

5. An electric motor stator assembly as set forth in claim 3 characterized in that two winding ends extend to the first cavity and are connected to the first terminal.

6. An electric motor assembly as set forth in claim 3 characterized in that the connector housing has a mounting face, the connector housing being mounted on the stator core with the mounting face against the core.

7. An electric motor assembly as set forth in claim 3 characterized in that the protector body is against a portion of one of the windings.

8. An electric motor assembly as set forth in claim 3 characterized in that the positions of the protector body, the switch housing, and the connector housing relative to each other in the cluster are determined by the configurations of the protector body, the switch housing, the connector housing, by the positions of the first and second protector terminals on the protector body, by the positions of the switch terminals on the switch housing, and by the locations of the cavities.

9. An electric motor assembly as set forth in claim 3 characterized in that the connector housing has a splicing cavity therein, a splicing terminal in the splicing cavity, two of the winding ends extending to the splicing cavity and being spliced by the splicing terminal.

10. An electric motor assembly as set forth in claim 3 characterized in that the connector housing has a body portion and a pair of spaced-apart arms extending from the body portion, the arms having outer free ends, the first cavity being in the body portion between the arms, the additional cavities extending into the outer free ends of the arms, the protector being between the arms, the switch housing being substantially against the outer free ends of the arms.

11. An electric motor assembly as set forth in claim 3 characterized in that the connector housing has a mating face and a mounting face which is oppositely directed with respect to the mating face, oppositely-facing sidewalls extending from the mating face to the mounting face, the connector housing being mounted on the core with the mounting face against the surface of the core, the protector being against one of the sidewalls of the connector housing, the cavities extending into the mating face of the connector housing, the switch housing having a switch housing mating face which extends in a plane which is perpendicular to the plane of the mating face of the connector housing, the switch terminals being L-shaped and extending from the switch housing mating face, the switch terminals each having one arm which extends towards the mating face of the connector housing and into one of the cavities.

12. An electric motor assembly as set forth in claim 11 characterized in that the assembly includes a motor frame, the frame having a recess therein in which the switch is positioned.

* * * * *